Aug. 14, 1956    L. BALSHONE    2,758,507
SPECTACLES, INCLUDING LENS-LOCKING AND LENS-RELEASING STRUCTURE
Filed Nov. 25, 1952
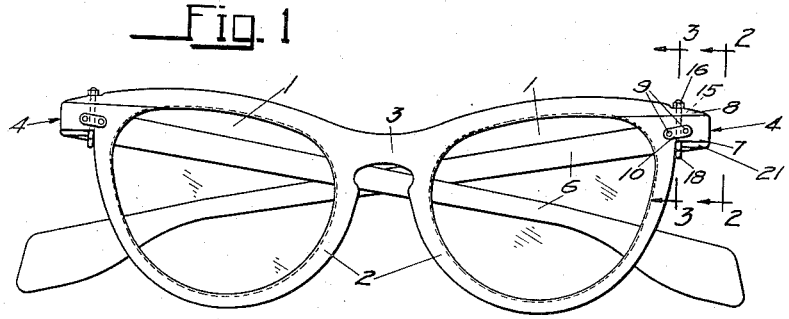
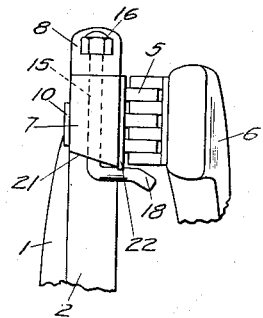 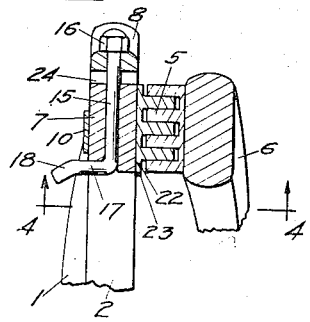
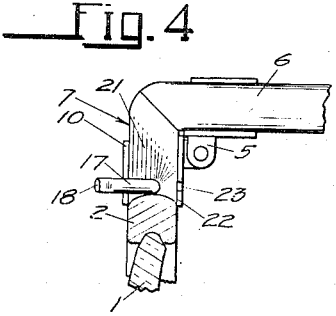
INVENTOR.
LEON BALSHONE
BY
Boyken, Mohler & Buckley
ATTORNEYS

United States Patent Office 2,758,507
Patented Aug. 14, 1956

2,758,507

SPECTACLES, INCLUDING LENS-LOCKING AND LENS-RELEASING STRUCTURE

Leon Balshone, San Francisco, Calif.

Application November 25, 1952, Serial No. 322,527

2 Claims. (Cl. 88—47)

This invention relates to spectacles, and has for one of its objects the provision of means in spectacles for easily and quickly releasing lens from the lens rims and for locking lens in said lens rims.

Another object of the invention is the provision of structure in spectacles that includes manually manipulatable and inconspicuous means for opening and closing the lens rims, as desired, for the insertion of lens therein and which means is also manipulatable for locking such lenses in the lens rims.

A still further object of the invention is the provision of structure in spectacles that is inseparable therefrom and that is manually manipulatable for releasing lenses from the lens rims and for locking lenses in said lens rims, and which structure is inconspicuous and does not noticeably alter the appearance of the spectacles.

Heretofore the changing of lenses from one pair of spectacles to another, or the replacement of lenses, has usually required the services of a specialist in that type of work, and in many instances special equipment or tools have been required. It has come to be quite common for persons to consider the appearance of their spectacles in connection with their dress. Certain styles, colors or patterns in spectacles are more appropriate with certain costumes, coiffures and the like than others, and heretofore where such details have been observed, it has been necessary to have a plurality of spectacles, which has been quite costly.

The present invention provides simple means for enabling any person to quickly, safely and easily change lenses from one frame to another. Inasmuch as the lenses in present spectacles usually are not circular, elliptical or even symmetrical in outline the lens will fit in only one position in each lens rim thus removing any chance for erroneously positioning the lenses in making changes.

Other objects and advantages will appear in the drawings and in the description.

In the drawings, Fig. 1 is a front elevational view of spectacles that incorporate the present invention therein, the temples being crossed on the rear side.

Fig. 2 is an enlarged, fragmentary edge view of the spectacles of Fig. 1 as seen from line 2—2 of Fig. 1.

Fig. 3 is an enlarged fragmentary sectional view taken from line 3—3 of Fig. 1, but in which view the locking member for the lens rim is shown in unlocked position and the lens rim is expanded to permit a lens therein to be removed or to permit a lens to be inserted in the lens rim.

Fig. 4 is a greatly enlarged bottom plan view of the portion of the spectacles shown in Fig. 3 as seen from line 4—4 of Fig. 3 except that the temple portion is swung to a position at right angles to the lens rim with which it is hingedly connected.

In detail, the spectacles shown in Fig. 1 consist of a frame that includes lenses 1 respectively secured in lens rims 2, the latter being joined by a bridge 3 that is adapted to extend over the bridge of the wearer's nose. It will be noted that the lenses are not symmetrical in any plane, and as the opposite surfaces of the lenses have different contours, it is impossible to improperly position the lenses in the lens rims without instantly detecting the error.

It is usual in spectacles to provide each of the lens rims with a projection 4 and these projections extend oppositely outwardly from the pair and are usually adjacent to the upper sides of the lens rims since hinges 5 that respectively connect temples 6 with the eyewires are each secured to one of said projections.

In the present invention, the lens rims are transversely and horizontally split at each projection 4 so that each projection is formed to provide a lower portion 7 and an upper portion 8.

A leaf of each hinge 5 is connected with each lower portion 7 in the conventional manner which usually consists of extending rivets 9 through each lower portion from the hinge leaf and through a retainer plate 10 on the front side of each portion and riveting said plate and leaf together with the portion 7 between them.

Extending vertically through the portions 7, 8 of each of the projections 4 is a vertical pin 15. Each pin 15 is preferably positioned at a point between each hinge pivot and the lens rim adjacent thereto.

A cap nut 16 is provided on the upper end of each pin 15 and each pin is rotatable in said portions 7, 8 about its longitudinal axis with the nut bearing against the upper side of the upper portion 8. Adjustment of the length of pin 15 is accomplished by turning cap nut 16.

The lower end portion 17 of each pin 15 is bent at about right angles to the main body of the pin from the point where the pin projects from the bore in each portion 7.

This end portion 17 thus forms a handle or arm, and its length is preferably such that the terminating outer end thereof will not project beyond the outer end of the hinge 5 when the arm is swung to the position shown in Fig. 2 and in which position said arm is disposed within the downwardly projecting confines of the hinge 5.

The part 18 of arm 17 that is at the terminating end (Fig. 3) is also preferably turned downwardly slightly so as to facilitate engaging it with the fingers or fingernail of a hand in order to swing said arm, and said terminating end is also rounded to preclude its being accidentally caught in a veil or the like.

As best seen in Figs. 2, 4 the lever surface of each portion 7 of projection 4 is formed with a cam surface 21 that is slantingly disposed and extends substantially across the width of the lever surface of portion 7 so that the rear side (the side nearest the eyes of the wearer) of portion 7 is of greater depth than the front side.

When arm 17 is swung to a position to the front side of portion 7 (Figs. 3, 4) the lens rim may automatically expand or spring apart a distance 24 which may be only a few millimeters, thus freeing the lens 1 that is held in the conventional groove in said lens rim.

The lower edge of hinge leaf 22 of hinge 5 extends slightly below the rear edge of cam surface 21 and said lower edge is formed with a slight lateral recess 23.

Upon swinging the arm 17 toward the rear side of portion 7 the arm and its cap nut 16 will cooperate with cam surface 22 to force the lens rim closed, and when said lens rim is closed, the arm 17, which is resilient, will snap into recess 23 (Fig. 2) and will be yieldably held there by its own inherent resiliency until swung back to the position shown in Fig. 4.

Whether the arm is swung in one direction or the other is not particularly important. That is, the parts may be reversed to function in the same manner as described by swinging the arm 17 forwardly instead of rearwardly. By the structure as described, the arm 17 is so inconspicuous when the spectacles are being worn as to be indistinguishable from conventional spectacles except upon minute examination.

In operation, when the wearer wishes to change the lenses to another frame, it is only necessary to swing each of arms 17 on the spectacles to the position shown in Figs. 3, 4 and the lens will be easily removed. The arms 17 on the new frame, being swung to the same position permits the lenses to be placed in the grooves in the new frame and by swinging the arms 17 to the locked position of Figs. 1, 2 the lens will be locked in the new frame.

As already mentioned, each of the lens rims is preferably presprung so as to automatically spring apart when the arms 17 are swung to the position shown in Figs. 3, 4.

It is obvious that as a modification, the hinge 5 may be moved upwardly so that the eyewire may be split below said hinge instead of above it. In such a case, the pin 15 could be reversed and a camming surface formed on the upper side of portion 8, but the structure as illustrated is the preferred form.

I claim:

1. Spectacles including a pair of lens rims in side by side relation for lenses; a pair of projecting portions on each of said lens rims on the oppositely outwardly disposed sides of the pair of lens rims disposed one above the other when said pair of lens rims are in horizontal alignment and in a generally vertical plane, each of said lens rims being split between each pair of said portions to permit spreading of each lens rim for release or insertion of the lens, a vertical pin rotatably extending through each pair of portions and having a head engaging the upper portion of each pair, a laterally extending arm on the lower end of each pin swingable with said pin about the axis of the latter, the lower surface of the lower portion of each pair thereof being slanted and disposed in said path for engagement with said arm to thereby urge said portions toward each other upon movement of said arm over the said slanted surface.

2. Spectacles including a pair of lens rims in side by side relation for lenses; a pair of projecting portions on each of said lens rims on the oppositely outwardly disposed sides of the pair of lens rims disposed one above the other when said pair of lens rims are in horizontal alignment and in a generally vertical plane, each of said lens rims being split between each pair of said portions to permit spreading of each lens rim for release or insertion of the lens, a vertical pin rotatably extending through each pair of portions and having a head engaging the upper portion of each pair, a laterally extending arm on the lower end of each pin swingable with said pin about the axis of the latter, the lower surface of the lower portion of each pair thereof being slanted and disposed in said path for engagement with said arm to thereby urge said portions toward each other upon movement of said arm over the said slanted surface, and a recess formed in the lower side of said lower portion of each pair thereof for receiving said arm when said portions are substantially together by said movement of said arm.

References Cited in the file of this patent

UNITED STATES PATENTS

| 319,733 | Lazarus | June 9, 1885 |
| 578,821 | Hummel | Mar. 16, 1897 |
| 1,269,422 | Gordon | June 11, 1918 |
| 2,350,338 | Casavant | June 6, 1944 |

FOREIGN PATENTS

| 89,954 | Germany | Jan. 4, 1897 |
| 597,731 | France | Sept. 7, 1925 |